US011853254B1

(12) United States Patent
Sommers et al.

(10) Patent No.: US 11,853,254 B1
(45) Date of Patent: Dec. 26, 2023

(54) METHODS, SYSTEMS, AND COMPUTER READABLE MEDIA FOR EXPOSING DATA PROCESSING UNIT (DPU) TRAFFIC IN A SMARTSWITCH

(71) Applicant: Keysight Technologies, Inc., Santa Rosa, CA (US)

(72) Inventors: Christian Paul Sommers, Bangor, CA (US); Peter J. Marsico, Chapel Hill, NC (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 17/962,453

(22) Filed: Oct. 7, 2022

(51) Int. Cl.
*G06F 15/16* (2006.01)
*G06F 15/173* (2006.01)
*H01H 43/02* (2006.01)

(52) U.S. Cl.
CPC ......... *G06F 15/1735* (2013.01); *H01H 43/02* (2013.01)

(58) Field of Classification Search
CPC .......................... H01H 43/02; G06F 15/1735
USPC ........................................................ 709/250
See application file for complete search history.

(56) References Cited

U.S. PATENT DOCUMENTS

| | | | |
|---|---|---|---|
| 6,917,595 B2 | 7/2005 | Chang et al. | |
| 7,145,866 B1 * | 12/2006 | Ting | G06F 11/2005 370/227 |
| 7,200,865 B1 * | 4/2007 | Roscoe | H04L 63/20 726/13 |
| 7,526,691 B1 | 4/2009 | Jayabharathi et al. | |
| 7,689,736 B2 * | 3/2010 | Kalwitz | G06F 3/0632 710/15 |
| 7,899,048 B1 | 3/2011 | Walker et al. | |
| 7,990,849 B2 * | 8/2011 | McGee | H04L 45/48 370/227 |
| 9,215,161 B2 * | 12/2015 | McGee | H04L 45/12 |
| 9,497,039 B2 * | 11/2016 | Greenberg | H04L 49/356 |
| 9,647,909 B2 | 5/2017 | Kuan et al. | |
| 9,674,639 B2 | 6/2017 | Qiu et al. | |
| 9,680,728 B2 | 6/2017 | Besser | |

(Continued)

FOREIGN PATENT DOCUMENTS

| | | |
|---|---|---|
| CN | 104320274 A | 1/2015 |
| CN | 108353004 B | 1/2022 |

(Continued)

OTHER PUBLICATIONS

"Aruba CX 10000 Series Switch with Pensando" Pensando, pp. 1-3 (2021).

(Continued)

*Primary Examiner* — Moustafa M Meky (57) ABSTRACT

Methods, systems, and computer readable media for exposing data processing unit (DPU) traffic in a smartswitch are disclosed. One example method occurs at a smartswitch controller implemented using at least one processor, the method comprising: receiving connection information for communicating with an in-line traffic processing agent; generating, using the connection information, one or more switching rules for causing traffic associated with a target DPU of a smartswitch to be directed to the in-line traffic processing agent; and providing the one or more switching rules to the smartswitch or another entity.

20 Claims, 7 Drawing Sheets

(56) References Cited

U.S. PATENT DOCUMENTS

| | | |
|---|---|---|
| 9,705,849 B2 | 7/2017 | Sood et al. |
| 9,858,104 B2 | 1/2018 | Tripathi et al. |
| 9,967,165 B2 | 5/2018 | Arora et al. |
| 10,063,473 B2 | 8/2018 | Wenig |
| 10,069,694 B1 | 9/2018 | Schwartz et al. |
| 10,135,702 B2 | 11/2018 | Lahiri |
| 10,623,309 B1 | 4/2020 | Gampel et al. |
| 10,693,817 B1 | 6/2020 | Melkild |
| 10,929,175 B2 | 2/2021 | Goyal et al. |
| 11,398,968 B2 | 7/2022 | Laslau |
| 11,593,294 B2 * | 2/2023 | Galles ............... G06F 13/4022 |
| 2002/0169822 A1 * | 11/2002 | Packard ................. G09B 7/00 709/203 |
| 2005/0270980 A1 * | 12/2005 | McGee ................. H04L 45/66 370/351 |
| 2006/0072543 A1 | 4/2006 | Lloyd et al. |
| 2006/0129847 A1 | 6/2006 | Pitsos |
| 2007/0038744 A1 | 2/2007 | Cocks et al. |
| 2007/0195776 A1 | 8/2007 | Zheng et al. |
| 2007/0280243 A1 | 12/2007 | Wray et al. |
| 2008/0044018 A1 | 2/2008 | Scrimsher et al. |
| 2009/0287837 A1 | 11/2009 | Felsher |
| 2010/0138920 A1 | 6/2010 | Kim et al. |
| 2010/0199275 A1 | 8/2010 | Mudigonda et al. |
| 2010/0238923 A1 | 9/2010 | Cheon et al. |
| 2010/0317420 A1 | 12/2010 | Hoffberg |
| 2011/0116719 A1 | 5/2011 | Bilobrov |
| 2011/0125892 A1 | 5/2011 | Rajan et al. |
| 2012/0106423 A1 | 5/2012 | Nylander et al. |
| 2012/0290703 A1 | 11/2012 | Barabash et al. |
| 2012/0317566 A1 | 12/2012 | Santos et al. |
| 2013/0159021 A1 | 6/2013 | Felsher |
| 2013/0288668 A1 | 10/2013 | Pragada et al. |
| 2014/0052852 A1 | 2/2014 | Dufour et al. |
| 2014/0229605 A1 | 8/2014 | Besser |
| 2014/0229781 A1 | 8/2014 | Whetsel |
| 2014/0229945 A1 | 8/2014 | Barkai et al. |
| 2014/0269709 A1 | 9/2014 | Benny et al. |
| 2014/0317293 A1 | 10/2014 | Shatzkamer |
| 2014/0317600 A1 | 10/2014 | Klunder et al. |
| 2015/0029848 A1 | 1/2015 | Jain |
| 2015/0063166 A1 | 3/2015 | Sif et al. |
| 2015/0234725 A1 | 8/2015 | Cillis et al. |
| 2015/0236936 A1 | 8/2015 | Waldbusser |
| 2015/0332357 A1 | 11/2015 | McBride et al. |
| 2015/0333979 A1 | 11/2015 | Schwengler et al. |
| 2016/0062781 A1 | 3/2016 | Tsirkin et al. |
| 2016/0110211 A1 | 4/2016 | Karnes |
| 2016/0127333 A1 | 5/2016 | Sood et al. |
| 2016/0147987 A1 | 5/2016 | Jang et al. |
| 2016/0191545 A1 | 6/2016 | Nanda et al. |
| 2016/0232019 A1 | 8/2016 | Shah et al. |
| 2016/0248858 A1 | 8/2016 | Qiu et al. |
| 2016/0323193 A1 | 11/2016 | Zhou et al. |
| 2016/0323243 A1 | 11/2016 | LeVasseur et al. |
| 2016/0352578 A1 | 12/2016 | Chen et al. |
| 2017/0026806 A1 | 1/2017 | Jampani et al. |
| 2017/0048110 A1 | 2/2017 | Wu et al. |
| 2017/0085459 A1 | 3/2017 | Xia et al. |
| 2017/0094002 A1 | 3/2017 | Kumar et al. |
| 2017/0099195 A1 | 4/2017 | Raney |
| 2017/0099197 A1 | 4/2017 | Raney |
| 2017/0118102 A1 | 4/2017 | Majumder et al. |
| 2017/0141974 A1 | 5/2017 | Lahiri |
| 2017/0163510 A1 | 6/2017 | Arora et al. |
| 2017/0214694 A1 | 7/2017 | Yan |
| 2018/0316543 A1 | 11/2018 | Hwang |
| 2020/0028772 A1 | 1/2020 | Aslau |
| 2020/0034173 A1 | 1/2020 | Rosenberg et al. |
| 2020/0412607 A1 | 12/2020 | Guan et al. |
| 2021/0320820 A1 | 10/2021 | Ruan |
| 2022/0377027 A1 * | 11/2022 | Gai ..................... H04L 45/74 |

FOREIGN PATENT DOCUMENTS

| | | |
|---|---|---|
| EP | 3046288 A1 | 7/2016 |
| EP | 3110106 A1 | 12/2016 |
| EP | 3119034 A1 | 1/2017 |
| WO | 2014030061 A2 | 2/2014 |
| WO | 2017083024 A1 | 5/2017 |

OTHER PUBLICATIONS

GigaIO Networks, "Rack-Scale Composable Infrastructure," Primer by GigaIO Networks, pp. 1-10, 2021.

Mellor, Chris, "Element invisibility in composable systems: PCIe vs Ethernet," Oct. 4, 2021.

Venkatraman et al., "Managing and Configuring Network through Software Defined Networking (SDN)," International Journal of Computer Science and Mobile Computing vol. 2 Issue. 11, Nov. 2013, p. 146-154.

Matsushima, "Network Programmability 'Squared'", SoftBank Corp, pp. 1-25 (2022).

Chi et al., "Efficient NFV Deployment in Data Center Networks," IEEE ICC 2015—Next Generation Networking Symposium, pp. 1-6 (2015).

Commonly-Assigned, co-pending U.S. Appl. No. 17/979,897 "Methods, Systems, and Computer Readable Media for Smartswitch Service Chaining" (Unpublished, filed Nov. 3, 2022).

Notice of Allowance for U.S. Appl. No. 16/039,283 (dated Mar. 9, 2022).

Notification of the Decision to Grant a Patent Right for Patent for Invention for Chinese Patent Application Serial No. 201680065423.9 (Oct. 11, 2021).

Non-Final Office Action for U.S. Appl. No. 16/039,283 (dated Jul. 22, 2021).

Decision to grant a European patent pursuant to Article 97(1) EPC for European Patent Application Serial No. 16864727.9 (dated Jul. 1, 2021).

Office Action for Chinese Patent Application Serial No. 2021051802456380 (dated May 21, 2021).

Advisory Action, Examiner-Initiate Interview Summary, and AFCP 2.0 Decision for U.S. Appl. No. 16/039,283 (dated Mar. 30, 2021).

Communication under Rule 71(3) EPC Intention to Grant for European Patent Application Serial No. 16 864 727.9 (dated Feb. 18, 2021).

Final Office Action for U.S. Appl. No. 16/039,283 (dated Dec. 31, 2020).

Non-Final Office Action for U.S. Appl. No. 16/039,283 (dated Jul. 8, 2020).

Communication pursuant to Article 94(3) EPC for European Application Serial No. 16 864 727.9 (dated May 4, 2020).

Commonly-Assigned, co-pending U.S. Appl. No. 16/039,283 for "Methods, Systems, and Computer Readable Media for Testing Virtualized Network Functions and Related Infrastructure," (Unpublished, filed Jul. 18, 2018).

Notice of Allowance and Fee(s) Due and Examiner-Initiated Interview Summary for U.S. Appl. No. 14/939,674 (dated Jul. 13, 2018).

Advisory Action and AFCP 2.0 Decision for U.S. Appl. No. 14/939,674 (dated May 4, 2018).

Final Office Action for U.S. Appl. No. 14/939,674 (dated Feb. 9, 2018).

Corrected Notice of Allowability for U.S. Appl. No. 14/960,865 (dated Feb. 7, 2018).

Notice of Allowance and Fee(s) Due for U.S. Appl. No. 14/960,865 (dated Jan. 2, 2018).

Non-Final Office Action for U.S. Appl. No. 14/939,674 (dated Sep. 21, 2017).

Non-Final Office Action for U.S. Appl. No. 14/960,865 (dated Apr. 21, 2017).

Notice of Allowance and Fee(s) Due & Examiner-Initiated Interview Summary for U.S. Appl. No. 13/765,628 (dated Jan. 10, 2017).

Notification of Transmittal of the International Search Report and the Written Opinion of the International Searching Authority, or the Declaration for International Application No. PCT/US2016/054163 (dated Jan. 5, 2017).

(56) References Cited

OTHER PUBLICATIONS

Advisory Action and Examiner Initiated Interview Summary for U.S. Appl. No. 13/765,628 (dated Oct. 17, 2016).
Final Office Action for U.S. Appl. No. 13/765,628 (dated Jul. 27, 2016).
"Virtual Taps," Net Optics: Architecting Visibility Into Your Netowrk, p. 1-5 (accessed Jun. 30, 2016).
Giotis et al., "Policy-based Orchestration of NFV Services in Software-Defined Networks," IEEE, pp. 1-5 (2015).
Kia et al., "Resource Optimization for Service Chain Monitoring in Software-Defined Networks," Fourth European Workshop on Software Defined Networks, IEEE, pp. 1-6 (2015).
"Network function virtualization," https://en.wikipedia.org/wiki/Network_function_ virtualization, pp. 1-7 (Nov. 23, 2015).
"Software-defined networking," https://en.wikipedia.org/wiki/Software-defined_networking, pp. 1-9 (Nov. 13, 2015).
"Ixia Phantom vTap with TapFlow Filtering," Ixia Data Sheet, Document No. 915-6805-01 Rev K, pp. 1-4 (Jul. 2015).
Non-Final Office Action for U.S. Appl. No. 13/765,628 (dated Dec. 1, 2014).

\* cited by examiner

| PHYSICAL PORT ID | DPU ID | METADATA (E.G., TRAFFIC TO EXPOSE/DIVERT) |
|---|---|---|
| 1 | A | ALL |
| 2 | B | ALL |
| 3 | C | ALL |
| 4 | D | ALL |
| 5 | E | ALL |
| 6 | F | ALL |

METHODS, SYSTEMS, AND COMPUTER READABLE MEDIA FOR EXPOSING DATA PROCESSING UNIT (DPU) TRAFFIC IN A SMARTSWITCH

TECHNICAL FIELD

The subject matter described herein relates to network testing and/or monitoring. More specifically, the subject matter relates to methods, systems, and computer readable media for exposing data processing unit (DPU) traffic in a smartswitch.

BACKGROUND

Data center environments or large scale computing environment typically provide high reliability and security and typically include networked resources (e.g., virtual or physical servers connected via network switches) sharable by multiple clients of the data center operator and may utilize software defined network (SDN) and/or virtualization. In some computing environments, an SDN or other network may utilize smartswitches. For example, a smartswitch may include a main processor (e.g., a central processing unit (CPU), a switch processor (e.g., a switching application-specific integrated circuit (ASIC)) and multiple DPUs (e.g., programmable processors that allows the user to program a respective processing pipeline for specific processing tasks) and may act as a top of rack (ToR) switch in a switching fabric. In this example, two or more smartswitches or DPUs thereof may be configured for high-availability (HA), where HA related traffic (e.g., keep-alive messages, HA sync message, or failover messages, etc.) may be communicated between the smartswitches such that if a smartswitch fails the other smartswitch can handle the failed smartswitch's workload with little to no downtime. While HA related traffic and/or other traffic may be communicated between smartswitches or DPUs therein, communications to or from DPUs of the smartswitches are generally internal and, as such, monitoring and testing DPU traffic or related functions can be difficult, tedious, and/or inefficient.

SUMMARY

Methods, systems, and computer readable media for exposing data processing unit (DPU) traffic in a smartswitch are disclosed. One example method occurs at a smartswitch controller implemented using at least one processor, the method comprising: receiving connection information for communicating with an in-line traffic processing agent; generating, using the connection information, one or more switching rules for causing traffic associated with a target DPU of a smartswitch to be directed to the in-line traffic processing agent; and providing the one or more switching rules to the smartswitch or another entity.

One example system includes a smartswitch controller implemented using at least one processor and a memory, the smartswitch controller configured for: receiving connection information for communicating with an in-line traffic processing agent; generating, using the connection information, one or more switching rules for causing traffic associated with a target DPU of a smartswitch to be directed to the in-line traffic processing agent; and providing the one or more switching rules to the smartswitch or another entity.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including one or more processors, network interfaces, and memory.

As used herein, each of the terms 'function', 'engine', and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for exposing data processing unit (DPU) traffic in a smartswitch. For example, a network node or appliance may include multiple DPUs (e.g., smart network interface cards (SmartNICs), infrastructure processing units (IPUs), etc.) for performing one or more processing tasks. In this example, the network node or appliance may be a smartswitch and may include a switch processor (e.g., an ASIC switch) for switching or providing traffic to or from a DPU therein. Since DPU related traffic in a smartswitch is typically internal (e.g., traversing an internal switch fabric or communications bus) instead of external (e.g., via physical links that can be tapped), to effectively test or monitor performance of a smartswitch or DPUs therein, DPU traffic in the smartswitch may need to be visible or accessible to traffic monitoring agents or other entities.

In accordance with some aspects of the subject matter described herein, techniques, methods, or mechanisms are disclosed for exposing DPU traffic in a smartswitch. For example, a smartswitch controller (e.g., a software defined network (SDN) controller, a test system controller, a network monitoring system controller, a network packet broker controller, etc.) in accordance with aspects described herein may receive connection information for communicating with an in-line traffic processing agent; generate, using the connection information, one or more switching rules for causing traffic associated with a target DPU of a smartswitch to be directed to the in-line traffic processing agent; and provide the one or more switching rules to the smartswitch or another entity.

Advantageously, in accordance with some aspects of the subject matter described herein, test systems, monitoring systems, or other system may be improved by configuring a smartswitch to expose DPU traffic in a smartswitch, thereby allowing external entities to test or monitor various aspects of a smartswitch, especially behaviors of DPUs of the smartswitch when the DPUs are in a high-availability (HA) configuration (e.g., with peer DPUs in another smartswitch).

Reference will now be made in detail to example embodiments of the subject matter described herein, examples of which are illustrated in the accompanying drawings. Wherever possible, the same reference numbers will be used throughout the drawings to refer to the same or like parts.

Figure 1:
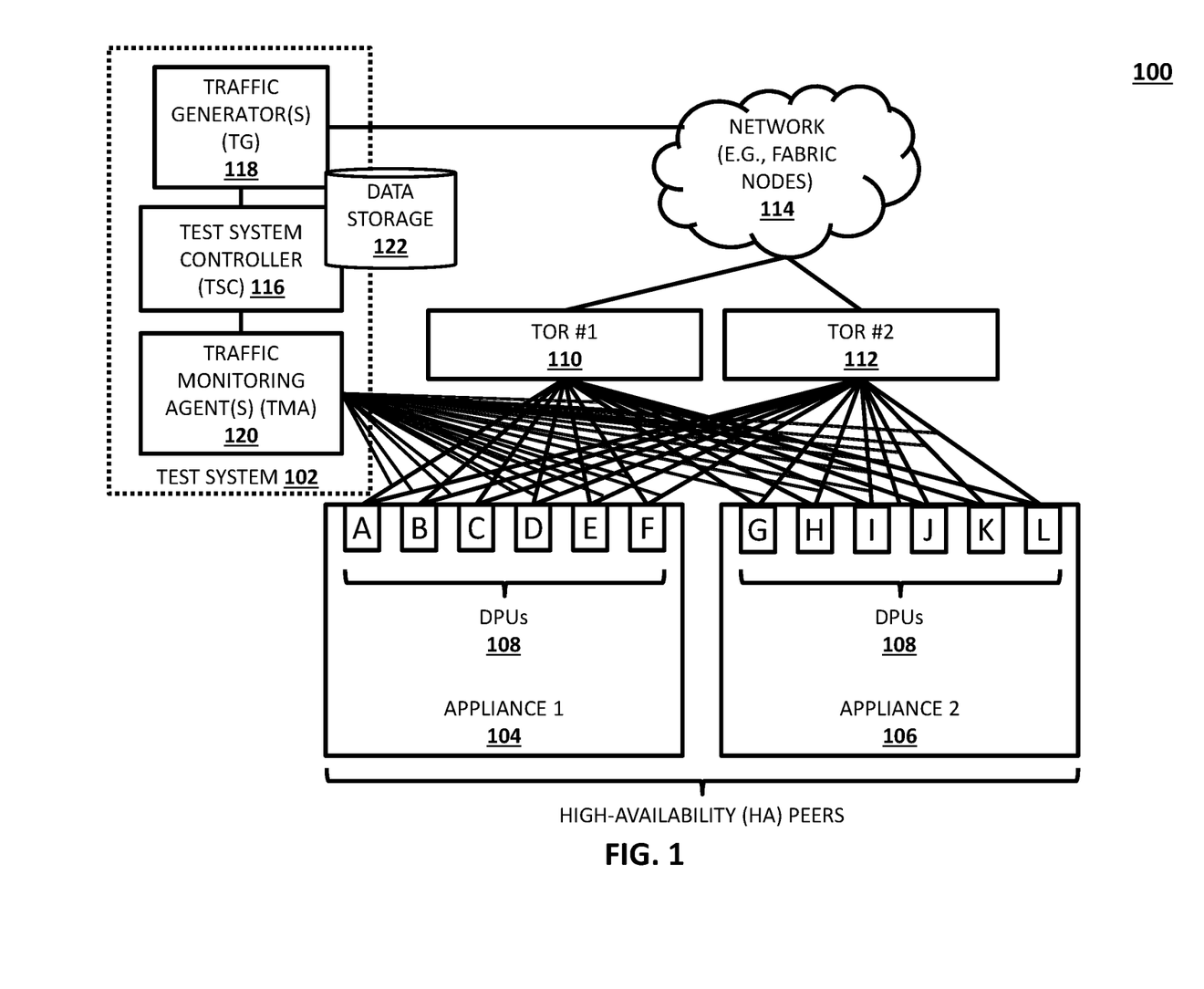
FIG. 1 is a diagram illustrating an example computing environment for testing multiple data processing units (DPUs) in a high-availability configuration.

FIG. 1 is a diagram illustrating an example computing environment 100 for testing DPUs in a HA configuration. Computing environment 100 may include one or more networks and/or one or more computer platforms, nodes, or devices. For example, computing environment 100 may include a test system 102 and one or more devices or systems under test (SUT).

Test system 102 may include at least one computer system (e.g., one or more computing platforms, nodes, or devices) associated with testing a SUT (e.g., one or more application servers, a network controller, or the like). For example, test system 102 may generate and send traffic to a SUT and/or receive traffic from the SUT and may analyze one or more performance aspects associated with the SUT. In some embodiments, a SUT may include network appliances 104 and 106 comprising DPUs (e.g., DPUs A-F and DPUs G-L, respectively) for performing various processing tasks and may be connected to a network 114 (e.g., a switching fabric) via top of rack (ToR) switches 110 and 112.

In some embodiments, test system 102 can be implemented using a stand-alone tool, a testing device, a network equipment test device or platform, or software executing on one or more processor(s). Test system 102 may be a single device or node or may be distributed across multiple devices or nodes. In some embodiments, test system 102 includes one or more modules for performing various test related functions. For example, test system 102 may include a traffic (e.g., packet) generator for generating test traffic and/or testing related applications (e.g., a test analyzer or test configuration manager) for configuring testing and/or generating test results.

In some embodiments, test system 102 may include a test system controller (TSC) 116, one or more traffic generator(s) (TG) 118, one or more traffic monitoring agent(s) (TMA) 120, and data storage 122. TSC 116 may be any suitable entity or entities (e.g., software executing on a processor, a field-programmable gateway array (FPGA), and/or an ASIC or a programmable ASIC (e.g., P4-programmable ASIC), or a combination of software, an FPGA, and/or an ASIC) for performing one or more aspects associated with configuring and testing a SUT (e.g., network appliances 104 and 106 or DPUs 108) and/or various aspects thereof. In some embodiments, TSC 116 may be implemented using one or more processors and/or memory. For example, TSC 116 may utilize one or more processors (e.g., executing software stored in memory) to generate traffic patterns or scenarios for various message streams (e.g., flows or sessions) and configure TG(s) 118 to generate and send traffic based on these patterns or scenarios. In another example, TSC 116 may also utilize one or more processors to perform or initiate various tests and/or analyses involving test packets and/or related responses from DPUs 108 or other entities under test. TSC 116 may send instructions to various modules or entities, e.g., TG 118, of test system 102 for controlling (e.g., to pause, (re)start, or stop) a test session.

In some embodiments, TSC 116 may interact with one or more testing applications. The testing applications can be, e.g., software or deployable agents, for configuring or testing the test system 102 or portions thereof. In some embodiments, the testing applications can include, but are not limited to, visibility applications, SDN controller applications, GUI and CLI applications, and test traffic generation applications for communicating with a SUT, e.g., network appliances 104 and 106.

TG 118 may be any suitable entity or entities (e.g., software executing on a processor, an ASIC, an FPGA, or a combination of software, an ASIC, or an FPGA) for performing one or more aspects associated with generating or synthesizing test sessions, test cases, or related test packets. For example, TG 118 may include one or more external or stand-alone device(s) for generating test traffic or may include software for traffic generation executable by various devices, processors, hardware, e.g., DPU(s) 108, appliance 104 or 106, a network node, TSC 116, switching ASICs, etc.

In some embodiments, TG 118 may be connected to one or more entities in computing environment 100. For example, e.g., where TG 118 is an external device connected to network 114 or a module executing on a node in network 114, TG 118 may be instructed (e.g., by TSC 116) to initiate a test session by sending test traffic to network appliances 104 and 106 via network 114 and ToR switches 110 and 112. In another example, e.g., where TG 118 is software executing on DPUs of network appliances 104 and 106, TG 118 may be instructed (e.g., by TSC 116) to initiate a test session by sending test traffic to network appliances 104 and 106 directly or via ToR switches 110 and 112.

TMA 120 may represent any suitable entity or entities (e.g., one or more computing platforms, network tap devices, or network tap software implemented using at least one processor) for monitoring traffic and/or observing network behavior. For example, TMA 120 may monitor network traffic associated with network appliances 104 and/or 106 arriving at and/or leaving from ToR switches 110 and 112 via one or more physical or virtual data link(s) and may compute various metrics associated with the network traffic. In another example, a first TMA 120 may monitor network traffic arriving at and/or leaving from ToR switch 110 and a second TMA 120 may monitor network traffic arriving at and/or leaving from ToR switch 112. In another example, TMA 120 may be deployed (e.g., as software executing on a processor, network interface card (NIC), or DPU) at one or more entities, e.g., nodes in network 114, ToR switches 110 and 112, or network appliances 104 and 106.

In some embodiments, TMA 120 may be configurable by test system 102 or TSC 116 to perform various aspects of traffic monitoring and reporting. For example, test system 102 or TSC 116 may configure TMA 120 to monitor network traffic and to report various traffic related metrics to TSC 116 or a related entity periodically (e.g., every five minutes) or aperiodically (e.g., dynamically, on request, or after a test session or test run is completed).

Data storage 122 may represent any suitable entity (e.g., a computer readable medium, a database, a storage device, or memory) for storing test configuration data, test session data, test results, traffic patterns, traffic or workload templates, received traffic metrics, and/or other data. For example, data storage 122 may store test configuration information and/or connection data indicating how test system 102 and related test system entities are connected to one or more links or devices associated with testing a SUT (e.g., network appliances 104 and 106.

In some embodiments, each of network appliances 104 and 106 may be housed in a chassis or other appropriate structure and may include computer processing resources, e.g., a number of DPUs 108. For example, as depicted in FIG. 1, network appliance 104 may include DPUs A-F and network appliance 106 may include DPUs G-L. In some embodiments, each of DPUs 108 may have a high-availability DPU peer in the other network appliance.

In some embodiments, each of ToR switches 110 and 112 may be connected (e.g., via virtual or physical links) to each of DPUs 108 in network appliances 104 and 106. ToR switches 110 and 112 may be connected to a network 114, e.g., by a number of different shared communications lines. In some embodiments, each of DPUs 108 on one appliance 104 or 106, may establish peering relationships with one or more DPUs on the alternate appliance 106 or 104, respectively, via ToR switches 110 and 112 over respective links between DPUs 108 and ToR switches 110 and 112.

In some embodiments, each of network appliances 104 and 106 or DPUs therein may be SONiC based entities and/or may utilize disaggregated application programming interfaces (APIs) for SONiC Hosts (DASH). For example, an SDN controller or other entity may configure a high-availability configuration between DASH DPUs (e.g., where each DPU has a high-availability DPU peer in the other network appliance) and may set up or configure routes for HA messages (e.g., heartbeat messages, state messages, etc.) and/or routes for other traffic. In this example, the SDN controller or other entity may be configured to handle failures of single DPU cards, DPU-ToR links, an entire chassis full of DPUs, or of one ToR switch.

In some embodiments, test system 102 or related entities may be configured to test high-availability (HA) configurations between HA peers, e.g., network appliances 104 and 106 and/or DPUs 108. For example, test system 102 or TSC 116 may configure TG 118 and TMA 120 to test HA aspects involving network appliances 104 and 106 and/or DPUs 108 therein. In this example, test system 102 or related entities may test failover detection, related failover performance, and/or other aspects by monitoring one or more links via TMA 120. In another example, test system 102 or related entities may test or monitor a DASH HA configuration by using one or more TMA 120 for monitoring border gateway protocol (BGP) data, bidirectional forwarding detection (BFD) data, or HA related messages from DPUs 108 and determining whether the information is processed appropriately, e.g., by updating a route, withdrawing a route, synchronizing an active flow table, or the like.

It will be appreciated that FIG. 1 is for illustrative purposes and that various depicted entities, their locations, and/or their functions described above in relation to FIG. 1 may be changed, altered, added, or removed.

Figure 2:
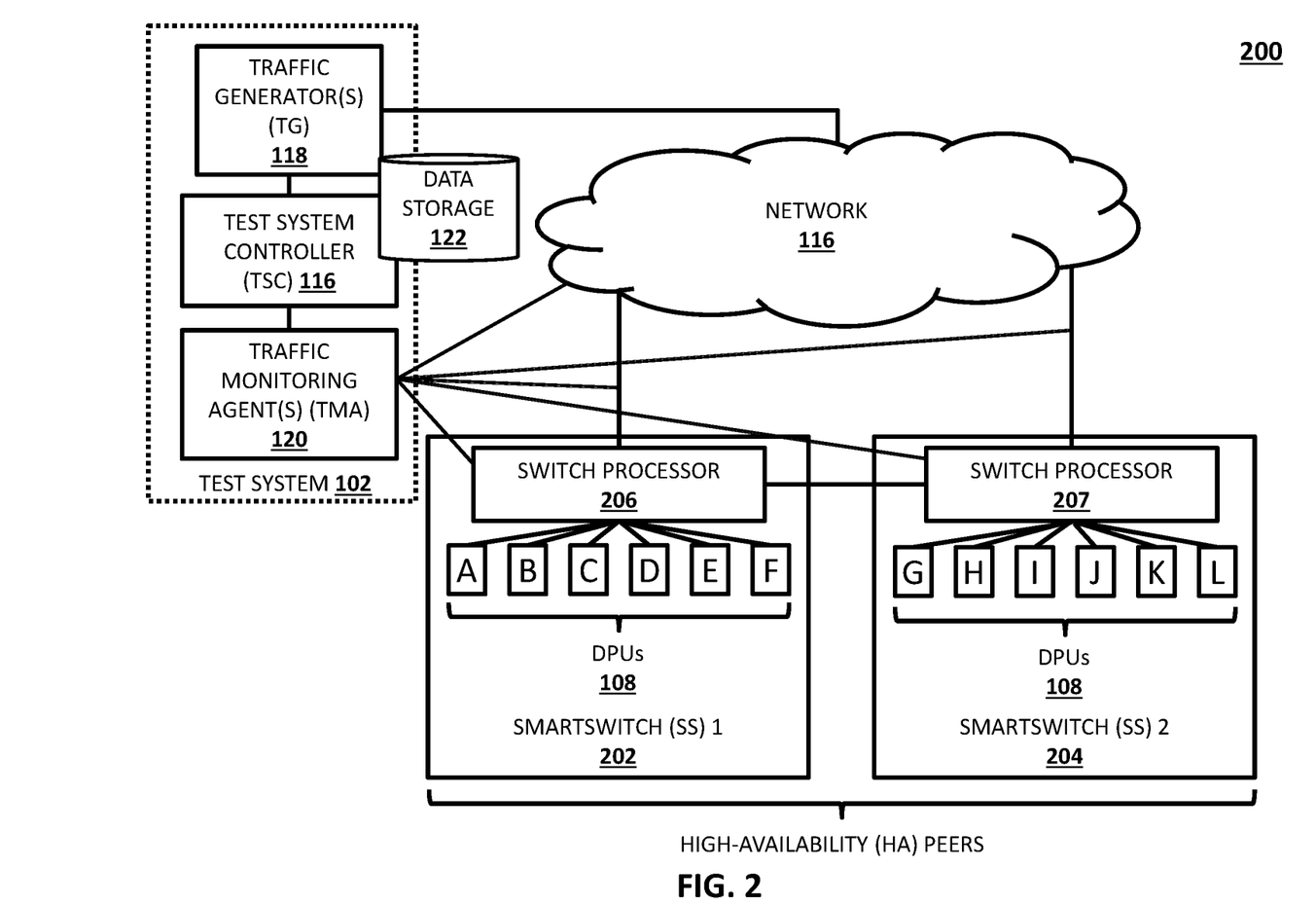
FIG. 2 is a diagram illustrating an example computing environment for testing a smartswitch.

FIG. 2 is a diagram illustrating an example computing environment 200 for testing one or more smartswitches. Computing environment 200 may include a test system 102, network 114, and smartswitch (SS) 202 and SS 204. SS 202 and SS 204 may include a switch processor 206 and a switch processor 207, respectively, for performing switch functions (e.g., similar to ToR switch 110 in FIG. 1) and DPUs 108 for performing various processing tasks (similar to DPUs 108 of network appliance 104 in FIG. 1). In some embodiments, each of SS 202 and SS 204 may represent a computing system (e.g., one or more devices, platforms, etc.) comprising a respective switch processor (e.g., switch processor 206 or 207) (e.g., an ASIC switch, a programmable ASIC switch, a main central processing unit (CPU) and an ASIC switch, etc.) and captive DPUs 108 (e.g., which may not have externally-accessible connections). In some embodiments, switch processors 206 and 207 may be responsible for routing or forwarding traffic to or from DPUs 108 therein. In some embodiments, switch processors 206 and 207 may include or interact with a main CPU for receiving instructions from TSC 196 or other controllers and for configuring switching resources (e.g., a switching ASIC or switch ASIC) or related functionality, e.g., via SONiC configuration commands, routing rule updates, or other instructions.

In some embodiments, SS 202 and SS 204 or DPUs 108 therein may be SONiC based entities and/or may utilize DASH. For example, each of DPUs 108 may run a subset of SONiC functions but lack some common control functions (such control functions may be implemented by switch processors 206 and 207). In this example, switch processors 206 and 207 or a related CPU (e.g., a main CPU) may run an enhanced version of SONiC or a different subset of SONiC (than DPUs 108).

In some embodiments, each of DPUs 108 of a given smartswitch (e.g., SS 202) may be addressable via a network address or related information (e.g., an API endpoint address or an API endpoint address and a port number). In such embodiments, traffic (e.g., messages) destined for a particular DPU may be exposed by a respective switch processor or a related CPU via routing or proxying the network address or related information. For example, switch processor 206 of SS 202 may receive and install or implement switching rules or related updates for causing traffic associated with one or more DPUs 108 of SS 202 to be sent to one or more TMA 120.

In some embodiments, test system 102 or related entities may be configured to test high-availability (HA) configurations between HA peers, e.g., SS 202 and SS 204 or DPUs 108 therein. For example, test system 102 or TSC 116 may configure TG 118 and TMA 120 to test HA aspects involving SS 202 and SS 204 or DPUs 108 therein. In this example, test system 102 or related entities may test failover detection, related failover performance, and/or other aspects by monitoring one or more links via TMA 120. In another example, test system 102 or related entities may test or monitor a DASH HA configuration by using one or more TMA 120 for monitoring BGP data, BFD data, or HA related messages (e.g., DPU-DPU traffic, such as HA sync or failover messages) from DPUs 108 and determining whether the information is processed appropriately, e.g., by updating a route, withdrawing a route, updating an active flow table entry, or the like.

In some embodiments, one or more TMA 120 may be utilized to observe and gather relevant traffic during a test session or test scenario. For example, TMA 120 may configured to intercept or observe original traffic traversing various links in environment 200 and/or to receive or obtain data (e.g., copies of traffic, traffic portions, metrics, or other information) from test related entities, intermediate nodes, or one or more SUTs (e.g., SS 202 and SS 204).

In some embodiments, test system 102 or related entities may initiate various test sessions or test scenarios involving SS 202 and SS 204 or DPUs 108 therein. For example, e.g., where TG 118 is connected directly or indirectly to SS 202 and SS 204, TSC 116 may configure a test session where TG 118 sends test traffic to SS 202 and SS 204 and SS 202 and SS 204 (or other entities) drops, discards, or ignores all non-test traffic or only exposes the test traffic to TMA 120 for analysis. In another example, TSC 116 may configure a test session where TG 118 sends test traffic to SS 202 and SS 204 but only exposes HA related messages or a subset of test traffic to TMA 120 for analysis.

In some embodiments, TMA 120 or other test or monitoring equipment may intercept or receive original traffic by having a test operator or TSC 116 insert or implement TMA 120 via cabling changes and/or a software configurable patch panel device. For example, TMA 120 may be inserted between inter-smartswitch links for observing and analyzing remote, inter-switch cross-link traffic (e.g., HA sync and failover messages). In another example, TMA 120 may be inserted into network 114 for observing and analyzing DPU-DPU traffic or other traffic traversing network 114.

In some embodiments, e.g., to monitor traffic and control messages flowing between a respective switch processor (e.g., switch processor 206 or 207) and captive DPUs 108 (e.g., DPUs that lack externally-accessible connections) of a smartswitch, test system 102 or a related entity may configure SS 202 and SS 204 to send copies of DPU traffic to TMA 120 or other external monitoring equipment. In such embodiments, since full or complete traffic mirroring may consume significant bandwidth, various mirroring policies or configurations may be utilized or implemented to reduce or manage bandwidth requirements, e.g., so that mirrored traffic can be carried on fewer ports or links. For example, a mirroring configuration may involve assigning a mirror port for each switch processor to DPU link. In another example, a mirroring configuration may involve configuring various entities (e.g., switch processors 206 and 207, one or more DPUs 108 of SS 202 and SS 204, or TMA 120 to truncate mirrored traffic, e.g., to only include headers (no payload) or to only include a payload portion. In another example, a mirroring configuration may involve only mirroring certain types of packets or portions thereof, e.g., inter-smartswitch traffic including DPU-DPU HA sync messages as well as DPU failover traffic (such as traffic originally processed by a DPU of SS 202, but redirected to a peer DPU of SS 204 because SS 202 had a DPU failure).

In some embodiments, e.g., to insert in-line TMA 120 and actively process traffic to/from a DPU of a smartswitch, switching rules (e.g., switching rules, routing rules, or related instructions) can be used to steer traffic to/from physical ports (e.g., front panel or back panel ports) of a smartswitch, thereby allowing external TMA 120 or other entities to be inserted between a respective switch processor and captive DPUs 108.

In some embodiments, by using switching rules for exposing DPU traffic to TMA 120 or other test or monitoring equipment, TMA 120 or other test or monitoring equipment may be located at any IP-reachable switch in network 114 (e.g., a datacenter fabric) or the internet and, as such, TMA 120 or the other test or monitoring equipment does not have to be physically connected to or co-located with SS 202 and SS 204 and can use remote mirroring techniques to observe DPU related traffic. For example, TMA 120 or other test or monitoring equipment may be remotely and/or centrally located, and can be "inserted" into the test path by using suitable switching/routing rules and generic routing encapsulation (GRE), network virtualization using GRE (NVGRE), virtual extensible local area network (VxLAN), or other encapsulation and/or virtualization techniques. In this example, round-trip time delays and/or congestion may occur but accurate time-stamping of monitored packets at the source could avoid distorted results where event timing is crucial.

In some embodiments, switching rules for exposing DPU traffic to TMA 120 or other test or monitoring equipment may include rules for redirecting remote, inter-switch cross-link traffic (e.g., HA sync and failover messages) to TMA 120 without changing the inter-switch links.

It will be appreciated that FIG. 2 is for illustrative purposes and that various depicted entities, their locations, and/or their functions described above in relation to FIG. 2 may be changed, altered, added, or removed.

Figure 3:
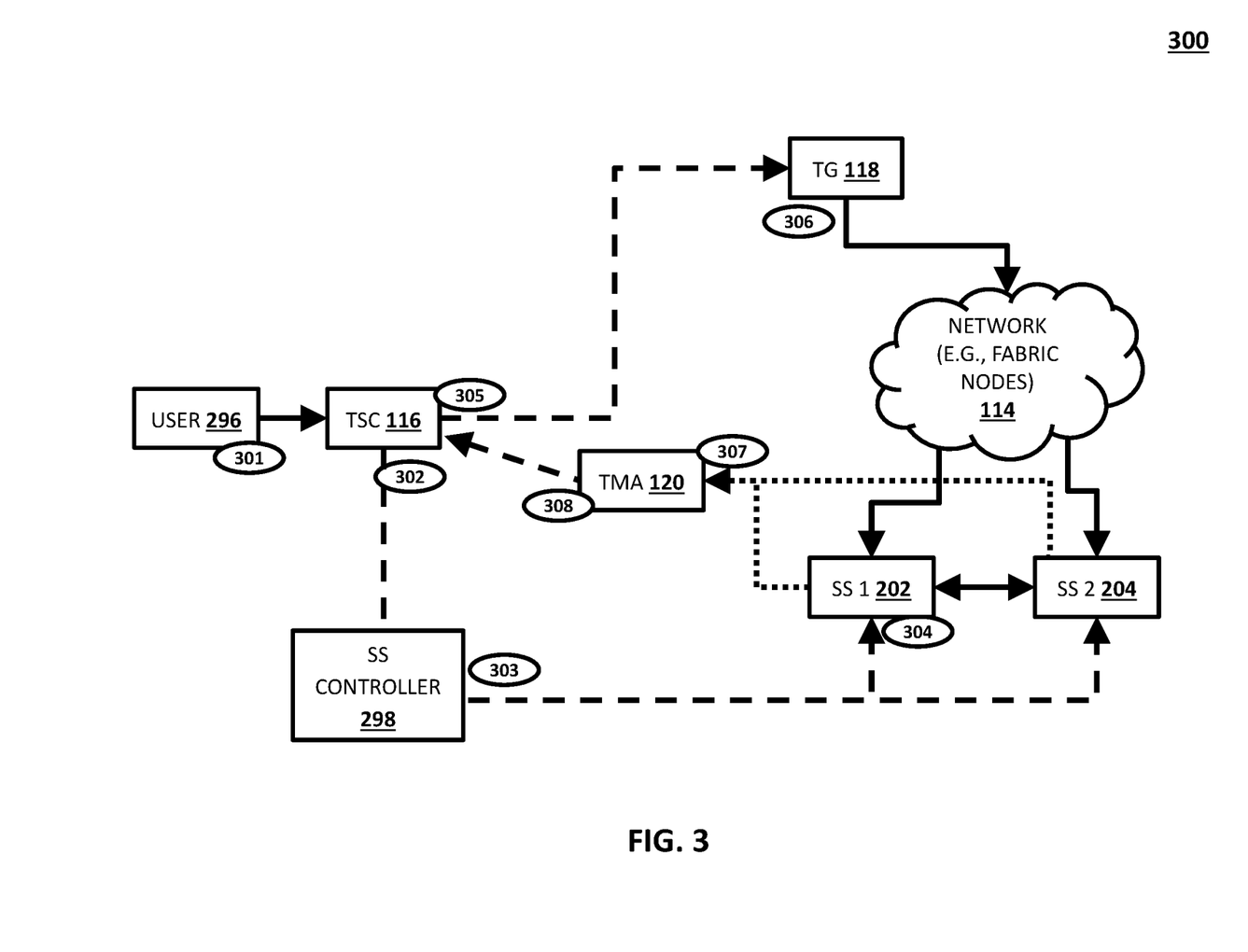
FIG. 3 illustrates an example scenario where DPU traffic is exposed to an external in-line traffic processing agent.

FIG. 3 illustrates an example scenario 300 where DPU traffic is exposed to an external in-line traffic processing agent. For example, since under normal operating conditions, internal ASIC-DPU traffic in a smartswitch is not visible to external devices or observers, various actions may be performed to expose this traffic to various devices, e.g., one or more external TMA 120 of test system 102. In some embodiments, as depicted in FIG. 3, TMA 120 may be implemented using a device or platform external to SS 202 and SS 204 and TSC 116, and/or a smartswitch controller 298 (e.g., an SDN controller, a test system controller, etc.) may be used to send instructions for configuring SS 202 and SS 204 to expose DPU traffic or other traffic to external TMA 120 via one or more physical ports (e.g., front panel ports).

In some embodiments, test system 102 may be configured for presenting or providing user 296 with instructions for cabling port(s) of a test system entity (e.g., TMA 120) to appropriate physical port(s) (e.g., a front panel port) of a monitored smartswitch (e.g., SS 202). For example, test system 102 or a related entity may use preconfigured or known connection data indicating which DPU traffic is exposed via which physical ports of a smartswitch to generate and provide appropriate cabling instructions.

In some embodiments where test system 102 or a related entity (e.g., TMA 120) and a smartswitch's physical ports (e.g., front panel or back panel ports) are connected to a software configurable patch panel device (e.g., a cross-connect device), test system 102 or a related entity may communicate directly with the software configurable patch panel device for automatically connecting the monitoring system port(s) to the appropriate smartswitch's physical port(s).

Referring to scenario 300, in step 301, user 296 (e.g., a test system operator) may provide test session configuration instructions for testing DPU traffic from or to a particular DPU or other aspects involving SS 202 and/or SS 204. For example, received test session configuration instructions may require generating metrics and reporting results, including operational and performance information (e.g., performance metrics, packet captures (PCAPs), packet logs, flow records, etc.) related to a DPU (e.g., DPU B) of SS 202.

In step 302, TSC 116 may generate instructions for exposing traffic associated with DPU B to TMA 120 or another monitoring entity for generating metrics and reporting results associated with the DPU traffic. In some embodiments, the generated instructions for exposing DPU traffic (e.g., traffic sent to or from DPU B) may be sent to an intermediate entity (e.g., SS controller 298, a DPU traffic exposure module, etc.), where the intermediate entity may use the instructions to generate and/or provide switching rules or other instructions for exposing DPU traffic to TMA 120 or another monitoring entity.

In step 303, SS controller 298 may generate (e.g., using instructions from TSC 116) one or more switching/routing rules or rule updates for updating or configuring a monitored smartswitch (e.g., SS 202 and/or SS 204) to expose DPU traffic. For example, where SS 202 is a SONiC based device, SS controller 298 (e.g., a DPU traffic exposure module executing on SS 202 or a separate device) may generate one or more switching rules, routing rules, or rule updates, e.g., via the use of SONiC configuration commands, SDN rule update commands, etc.

In step 304, SS 202 may receive and process rules or rule updates, e.g., using standard SDN rule updating mechanisms, to cause traffic associated with a particular DPU (e.g., DPU B) to be exposed to TMA 120. For example, where SS 202 is a SONiC based device, SONiC based instructions may cause SS 202 or switch processor 206 therein to modify or update one or more entries in its internal routing table. In this example, the routing table of SS 202 may be modified such that traffic flowing between switch processor 206 of SS 202 and DPU B is effectively redirected to physical port(s) on SS 202 (e.g., a front panel port) for processing by TMA 120. Continuing with this example, the modified routing table of SS 202 may include rules that direct post-processed traffic received from TMA 120 to DPU B.

In step 305, TSC 116 may send instructions to TG 118 for generating and sending test traffic (e.g., workloads) to DPU B and/or other DPUs of SS 202.

In step 306, after receiving instructions from TSC 116, TG 118 may generate and send test traffic (e.g., workloads) toward SS 202 via network 114. Traffic destined for DPU B may arrive at switch processor 206 of SS 202 and may be forwarded or redirected (e.g., via the modified routing/switching rules) out one or more physical port of SS 202 toward TMA 120.

In some embodiments, DPU traffic that is exposed to test system 102 or element thereof may be limited to particular messages or types of traffic. For example, rules or rule updates received and implemented by SS 202 may cause only test traffic, non-test traffic, intra-switch traffic, inter-switch traffic, DPU-DPU traffic, or HA related traffic to be redirected to TMA 120 for analysis.

In some embodiments, TMA 120 may be configured for observing and/or processing DPU traffic (e.g., addressed to or destined for DPU B via switch processor 206) and returning the processed traffic to at least one physical port (e.g., the same or different front panel port(s)) of a smartswitch (e.g., SS 202). In such embodiments, a routing table of SS 202 may include rules that direct post-processed traffic received from TMA 120 to an appropriate DPU (e.g., DPU B).

In step 307, TMA 120 may observe and/or process the DPU traffic and, after processing and/or analysis, may subsequently provide or send the traffic back to SS 202 via the same physical port it was received on or via another physical port. In some embodiments, TMA 120 may be directly cabled to a physical port (e.g., front panel port '2') of SS 202 or it may be indirectly connected to a physical port (e.g., front panel port '2') of SS 202 via an intermediate network, e.g., LAN, WAN, etc.

In some embodiments, TMA 120 or another test system entity connected to a physical port of SS 202 may be configured to generate test packets destined for a target DPU and/or to monitor or analyze traffic received from the targeted DPU (e.g., DPU B).

In some embodiments, TMA 120 or another test system entity receiving redirected packets originally headed to or from a target DPU(s) (e.g., DPU B) may modify the contents of some or all of the redirected packets, e.g., by modifying packet header contents, modifying routing label parameters, etc. In some embodiments, TMA 120 or another test system entity receiving redirected packets originally headed to or from a target DPU(s) (e.g., DPU B) may introduce or cause one or more impairments to some or all of the redirected packets (e.g., by adding latency, jitter, etc.) and may inject the modified or impaired traffic back to SS 202, e.g., via the same physical port it received the traffic on or another physical port of SS 202.

In some embodiments, TMA 120 or another test system entity receiving redirected packets originally headed to or from a target DPU(s) (e.g., DPU B) may decrypt some or all of the redirected packets prior to analyzing or processing the packets. In such embodiments, e.g., after processing or analyzing the decrypted packets, the packets may then be re-encrypted by the TMA 120 or the test system entity prior to the transmission of these packets back to SS 202, e.g., via the same physical port it received the traffic on or another physical port of SS 202.

In some embodiments, TMA 120 or another test system entity receiving redirected packets originally headed to or from a target DPU(s) (e.g., DPU B) may discard or drop some or all of the redirected packets, e.g., as part of a HA related failover event test. For example, during a test session involving testing SS 202 or DPUs thereof in a HA DPU configuration, dropping redirected packets to or from a target DPU (e.g., DPU B) may act as a test system-initiated failover event, which should cause a paired standby DPU (e.g., DPU D or DPU H) to become "active". In this example, test system 102 or related entities may be configured for monitoring this paired DPU and for generating and reporting metrics or other information associated with the failover event.

In step 308, data (e.g., traffic metrics, performance metrics, flow records, notifications, alarms, alerts, metadata, etc.) associated with the observed traffic may be logged and reported to user 296, test system 102, TSC 116, or other entities. For example, test results may be made available to user via a GUI provided by TSC 116 or another entity.

In some embodiments, flow records, reports, notifications, alarms, alerts, or results may be generated by TMA 120, test system 102, or another entity, e.g., using data received from or generated by TMA 120 and/or based on analysis of the observed traffic.

It will be appreciated that FIG. 3 and steps 301-308 are for illustrative purposes and that different and/or additional actions may be performed when exposing DPU traffic and, moreover, that steps 301-308 or related actions may be performed by different entities than those depicted in FIG. 3.

Figure 4:
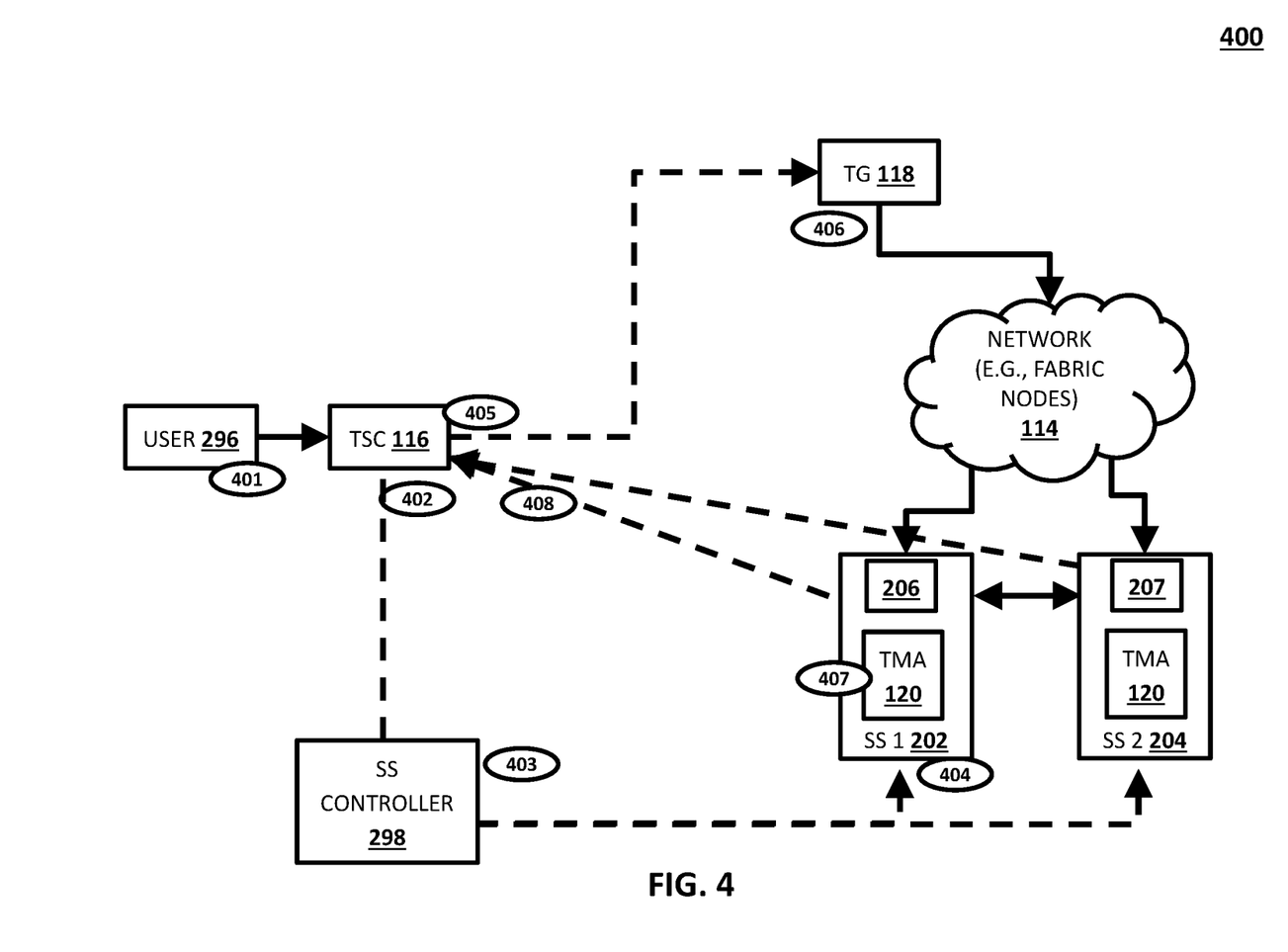
FIG. 4 illustrates an example scenario where DPU traffic is exposed to an internal in-line traffic processing agent.

FIG. 4 illustrates an example scenario 400 where DPU traffic is exposed to an internal in-line traffic processing agent. Scenario 400 may represent a scenario where test system 102 is configured to test one or more aspects of SS 202, e.g., traffic to or from a particular DPU of SS 202 and may configure SS 202 or DPU thereof to implement TMA 120. For example, since under normal operating conditions, internal ASIC-DPU traffic in a smartswitch is not visible to external devices or observers, various actions may be performed (e.g., by SS controller 298 and/or other entities) to expose this traffic to various devices, e.g., TMA 120 implemented by DPU A of test system 102. In some embodiments, as depicted in FIG. 3, TMA 120 may represent monitoring or analysis software executing on one or more DPU(s), e.g., internal to SS 202 or SS 204.

In some embodiments, test system 102 may be configured for presenting or providing user 296 with instructions for cabling port(s) of a test system entity (e.g., TSC 116) to appropriate physical port(s) (e.g., a front panel port) of a monitored smartswitch (e.g., SS 202). For example, test system 102 or a related entity may use preconfigured or known connection data indicating which DPU traffic is exposed via which physical ports of a smartswitch to generate and provide appropriate cabling instructions.

In some embodiments where test system 102 or a related entity (e.g., TSC 116) and a smartswitch's physical ports (e.g., front panel or back panel ports) are connected to a software configurable patch panel device (e.g., a cross-connect device), test system 102 or a related entity may communicate directly with the software configurable patch panel device for automatically connecting the monitoring system port(s) to the appropriate smartswitch's physical port(s).

Referring to scenario 400, in step 401, user 296 (e.g., a test system operator) may provide test session configuration instructions for testing DPU traffic from or to a particular DPU or other aspects involving SS 202 and/or SS 204. For example, received test session configuration instructions may require generating metrics and reporting results, including operational and performance information (e.g., performance metrics, packet capture (PCAP), etc.) related to a DPU (e.g., DPU B) of SS 202.

In step 402, TSC 116 may generate instructions for exposing traffic associated with DPU B to TMA 120 or another monitoring entity for generating metrics and reporting results associated with the DPU traffic. In some embodiments, the generated instructions for exposing DPU traffic (e.g., traffic sent to or from DPU B) may be sent to an intermediate entity (e.g., SS controller 298, a DPU traffic exposure module, etc.), where the intermediate entity may use the instructions to generate and/or provide switching rules or other instructions for exposing DPU traffic to TMA 120 or another monitoring entity.

In some embodiments, e.g., where DPU(s) of SS 202 implements TMA 120, TSC 116 may generate instructions for causing a particular DPU of SS 202 to implement TMA 120. For example, TSC 116 may provide an executable to be installed on DPU A of SS 202, e.g., by providing the software to SS 202 directly or via an intermediary (e.g., SS controller 298).

In step 403, SS controller 298 may generate (e.g., using instructions from TSC 116) one or more switching/routing rules or rule updates for updating or configuring a monitored smartswitch (e.g., SS 202 and/or SS 204) to expose DPU traffic. For example, where SS 202 is a SONiC based device, SS controller 298 (e.g., a DPU traffic exposure module executing on SS 202 or a separate device) may generate one or more switching rules, routing rules, or rule updates, e.g., via the use of SONiC configuration commands, SDN rule update commands, etc.

In some embodiments, SS controller 298 may generate or provide instructions to SS 202 for configuring a particular DPU of SS 202 to implement TMA 120. In such embodiments, SS controller 298 may generate and provide switching rules for switch processor 206 of SS 202 such that traffic destined to or from a target DPU of SS 202 is diverted to the DPU implementing TMA 120 for processing or analysis and that post-processed traffic received from the DPU implementing TMA 120 is sent to the target DPU.

In step 404, SS 202 may receive and process rules or rule updates, e.g., using standard SDN rule updating mechanisms, to cause traffic associated with a particular DPU (e.g., DPU B) to be exposed to TMA 120. For example, where SS 202 is a SONiC based device, SONiC based instructions may cause SS 202 or switch processor 206 therein to modify or update one or more entries in its internal routing table. In this example, the routing table of SS 202 may be modified such that traffic flowing between switch processor 206 and DPU B is effectively redirected to a DPU implementing TMA 120. Continuing with this example, the modified routing table of SS 202 may include rules that direct post-processed traffic received from TMA 120 to DPU B.

In step 405, TSC 116 may send instructions to TG 118 (e.g., an external device or an internal module, such as software executing on a DPU, a switching ASIC, switch processor 206, a CPU, or other processor) for generating and sending test traffic (e.g., workloads) to DPU B and/or other DPUs of SS 202.

In step 406, after receiving instructions from TSC 116, TG 118 may generate and send test traffic (e.g., workloads) toward SS 202 via network 114. Traffic destined for DPU B may arrive at switch processor 206 of SS 202 and may be forwarded or redirected (e.g., via the modified routing/switching rules) out one or more physical port of SS 202 toward TMA 120.

In some embodiments, DPU traffic that is exposed to test system 102 or element thereof may be limited to particular messages or types of traffic. For example, rules or rule updates received and implemented by SS 202 may cause only test traffic, non-test traffic, intra-switch traffic, inter-switch traffic, DPU-DPU traffic, or HA related traffic to be redirected to TMA 120 for analysis.

In some embodiments, TMA 120 may be configured for observing and/or processing DPU traffic (e.g., addressed to or destined for DPU B via switch processor 206) and returning the processed traffic to at least one physical port (e.g., the same or different front panel port(s)) of a monitored smartswitch (e.g., SS 202). In such embodiments, a routing table of SS 202 may include rules that direct post-processed traffic received from TMA 120 to an appropriate DPU (e.g., DPU B).

In step 407, TMA 120 may observe and/or process the DPU traffic and, after processing and/or analysis, may subsequently provide or send the traffic back to SS 202 via the same physical port it was received on or via another physical port. In some embodiments, TMA 120 may be directly cabled to a physical port (e.g., front panel port '2') of SS 202 or it may be indirectly connected to a physical port (e.g., front panel port '2') of SS 202 via an intermediate network, e.g., LAN, WAN, etc.

In some embodiments, TMA 120 or another test system entity connected to a physical port of SS 202 may be configured to generate test packets destined for a target DPU and/or to monitor or analyze traffic received from the targeted DPU (e.g., DPU B).

In some embodiments, TMA 120 or another test system entity receiving redirected packets originally headed to or from a target DPU(s) (e.g., DPU B) may modify the contents of some or all of the redirected packets, e.g., by modifying packet header contents, modifying routing label parameters, payload contents, etc.

In some embodiments, TMA 120 or another test system entity receiving redirected packets originally headed to or from a target DPU(s) (e.g., DPU B) may introduce or cause one or more impairments to some or all of the redirected packets (e.g., by adding latency, jitter, etc.) and may inject the modified or impaired traffic back to SS 202, e.g., via the same physical port it received the traffic on or another physical port of SS 202.

In some embodiments, TMA 120 or another test system entity receiving redirected packets originally headed to or from a target DPU(s) (e.g., DPU B) may decrypt some or all of the redirected packets prior to analyzing or processing the packets. In such embodiments, e.g., after processing or analyzing the decrypted packets, the packets may then be re-encrypted by the TMA 120 or the test system entity prior to the transmission of these packets back to SS 202, e.g., via the same physical port it received the traffic on or another physical port of SS 202.

In some embodiments, TMA 120 or another test system entity receiving redirected packets originally headed to or from a target DPU(s) (e.g., DPU B) may discard or drop some or all of the redirected packets, e.g., as part of a HA related failover event test. For example, during a test session involving testing SS 202 or DPUs thereof in a HA DPU configuration, dropping redirected packets to or from a target DPU (e.g., DPU B) may act as a test system-initiated failover event, which should cause a paired standby DPU (e.g., DPU D or DPU H) to become "active". In this example, test system 102 or related entities may be configured for monitoring this paired DPU and for generating and reporting metrics or other information associated with the failover event.

In step 408, data (e.g., traffic metrics, performance metrics, flow records, notifications, alarms, alerts, metadata, etc.) associated with the observed traffic may be logged and reported to user 296, test system 102, TSC 116, or other entities. For example, test results may be made available to user via a GUI provided by TSC 116 or another entity.

In some embodiments, flow records, reports, notifications, alarms, alerts, or results may be generated by TMA 120, test system 102, or another entity, e.g., using data received from or generated by TMA 120 and/or based on analysis of the observed traffic.

It will be appreciated that FIG. 4 and steps 401-408 are for illustrative purposes and that different and/or additional actions may be performed when exposing DPU traffic and, moreover, that steps 401-408 or related actions may be performed by different entities than those depicted in FIG. 4.

Figure 5:
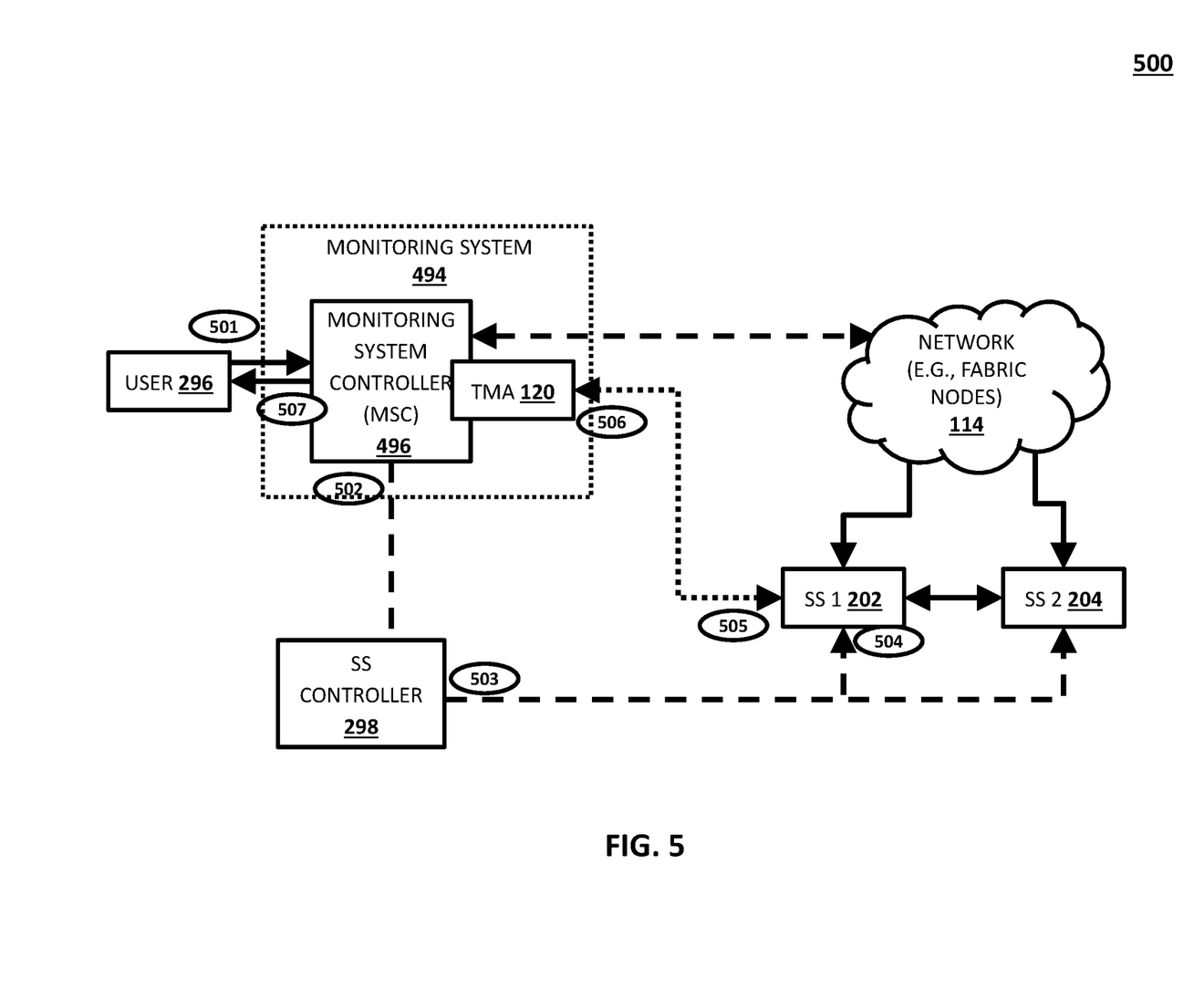
FIG. 5 illustrates an example scenario where DPU traffic is exposed to a monitoring system.

FIG. 5 illustrates an example scenario 500 where DPU traffic is exposed (e.g., made accessible) to a monitoring system 494. For example, since under normal operating conditions, internal ASIC-DPU traffic in a smartswitch is not visible to external devices or observers, various actions may be performed (e.g., by SS controller 298 and/or other entities) to expose this traffic to various devices, e.g., TMA 120 that may be internal or external to SS 202 and SS 204.

In some embodiments, monitoring system 494 may represent any suitable entity or entities for monitoring and/or analyzing traffic (e.g., packets or messages) from or to one or more device(s), a network, or computing environment (e.g., SS 202 and SS 204 or other network nodes). For example, monitoring system 494 may include a monitoring system controller (MSC) 496 for controlling or managing various aspects of monitoring system 494, SS controller 298 for controlling or managing aspects of SS 202 and/or SS 204, one or more TMA 120 for performing traffic monitoring and/or related analysis, and/or other entities for monitoring traffic. In some embodiments, MSC 496 may include or interact with SS controller 298, a network packet broker (NPB), an NPB controller, or an NPB application executing on a device or platform. In some embodiments, SS controller 298 may include or interact with an NPB, an NPB controller, an SDN controller, MSC 496, or a DPU traffic exposure module of monitoring system 494.

In some embodiments, monitoring system 494 may be configured for presenting or providing user 296 with instructions for cabling port(s) of a monitoring system entity (e.g., TMA 120) to appropriate physical port(s) (e.g., a front panel port) of a monitored smartswitch (e.g., SS 202). For example, monitoring system 494 or a related entity may use preconfigured or known connection data indicating which DPU traffic is exposed via which physical ports of a smartswitch to generate and provide appropriate cabling instructions.

In some embodiments where monitoring system 494 or a related entity and a monitored smartswitch's physical ports (e.g., front panel or back panel ports) are connected to a software configurable patch panel device (e.g., a cross-connect device), monitoring system 494 or a related entity may communicate directly with the software configurable patch panel device for automatically connecting the monitoring system port(s) to the appropriate monitored smartswitch's physical port(s).

Referring to scenario 500, in step 501, user 296 (e.g., a monitoring system operator) may provide instructions (e.g., via a monitoring intent or other monitoring instruction) for monitoring DPU traffic from or to a particular DPU or other aspects involving SS 202 and/or SS 204. For example, received monitoring instructions may require generating metrics and reporting results, including operational and performance information (e.g., performance metrics, PCAPs, packet logs, flow records, network and/or application intelligence reports, etc.) related to a DPU (e.g., DPU B) of SS 202.

In step 502, MSC 496 (e.g., an NPB, an NPB controller, an NPB application, etc.) may generate instructions for exposing traffic associated with DPU B to TMA 120 or another monitoring entity for generating metrics and reporting results associated with the DPU traffic. In some embodiments, the generated instructions for exposing DPU traffic (e.g., traffic sent to or from DPU B) may be sent to an intermediate entity (e.g., SS controller 298, a DPU traffic exposure module, etc.), where the intermediate entity may use the instructions to generate and/or provide switching rules or other instructions for exposing DPU traffic to TMA 120 or another monitoring entity.

In step 503, SS controller 298 may generate (e.g., using instructions from MSC 496) one or more switching/routing rules or rule updates for updating or configuring a monitored smartswitch (e.g., SS 202 and/or SS 204) to expose DPU traffic. For example, where SS 202 is a SONiC based device, SS controller 298 (e.g., a DPU traffic exposure module executing on SS 202 or a separate device) may generate one or more switching rules, routing rules, or rule updates, e.g., via the use of SONiC configuration commands, SDN rule update commands, etc.

In step 504, SS 202 may receive and process rules or rule updates, e.g., using standard SDN rule updating mechanisms, to cause traffic associated with a particular DPU (e.g., DPU B) to be exposed to TMA 120. For example, where SS 202 is a SONiC based device, SONiC based instructions may cause SS 202 or switch processor 206 therein to modify or update one or more entries in its internal routing table. In this example, the routing table of SS 202 may be modified such that traffic flowing between switch processor 206 and DPU B is effectively redirected to physical port(s) on SS 202 (e.g., a front panel port) for processing by TMA 120. Continuing with this example, the modified routing table of SS 202 may include rules that direct post-processed traffic received from TMA 120 to DPU B.

In some embodiments, TMA 120 may be configured for observing and/or processing DPU traffic (e.g., addressed to or destined for DPU B via switch processor 206) and returning the processed traffic to at least one physical port (e.g., the same or different front panel port(s)) of a monitored smartswitch (e.g., SS 202). In such embodiments, a routing table of SS 202 may include rules that direct post-processed traffic received from TMA 120 to an appropriate DPU (e.g., DPU B).

In step 505, traffic destined for DPU B may reach switch processor 206 of SS 202 and may be forwarded or redirected (e.g., via the modified routing/switching rules) out one or more physical port of SS 202 toward TMA 120.

In step 506, TMA 120 may observe and/or process the DPU traffic and, after processing and/or analysis, may subsequently provide or send the traffic back to SS 202 via the same physical port it was received on or via another physical port. In some embodiments, TMA 120 may be directly cabled to a physical port (e.g., front panel port '2') of SS 202 or it may be indirectly connected to a physical port (e.g., front panel port '2') of SS 202 via an intermediate network, e.g., LAN, WAN, etc.

In step 507, data (e.g., traffic metrics, performance metrics, flow records, notifications, alarms, alerts, metadata, application and/or threat intelligence data, etc.) associated with the observed traffic may be logged and reported to user 296, monitoring system 494, MSC 496, or other entities. For example, traffic analysis reports may be made available to user 296 via a GUI provided by MSC 496 or another entity.

In some embodiments, flow records, reports, notifications, alarms, alerts, or results may be generated by TMA 120, monitoring system 494, or another entity, e.g., using data received from or generated by TMA 120 and/or based on analysis of the observed traffic.

It will be appreciated that FIG. 5 and steps 501-507 are for illustrative purposes and that different and/or additional actions may be performed when exposing DPU traffic and, moreover, that steps 501-507 or related actions may be performed by different entities than those depicted in FIG. 5.

Figure 6:
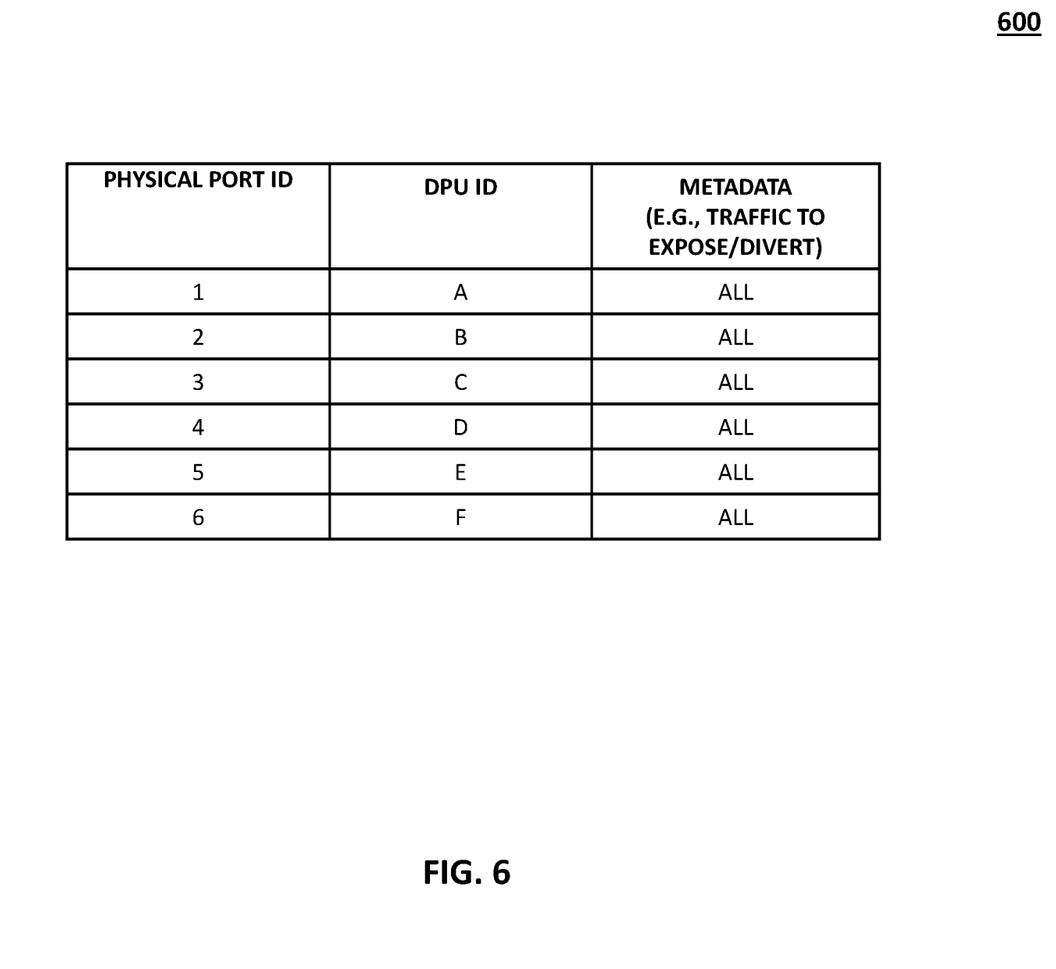
FIG. 6 illustrates example connection data indicating front panel ports and associated DPU traffic.

FIG. 6 illustrates example connection data 600 indicating front panel ports and associated DPU traffic, e.g., which front panel ports of SS 202 expose which DPU's traffic. In some embodiments, connection data 600 or portions or variations thereof may be accessed and/or stored by TSC 116, MSC 496, SS 202, SS 204, and/or other entities using one or more data structures or storage devices.

In some embodiments, connection data 600 may include any suitable information for determining how to expose (e.g., forward or route) DPU traffic (e.g., traffic to or from a DPU of SS 202 or SS 204) to an in-line traffic processing agent (e.g., TMA 120). For example, connection data 600 may indicate that traffic to or from a first DPU (e.g., DPU A) is sent out through a front panel port (e.g., a port 1) of SS 202, while traffic to or from a second DPU (e.g., DPU B) is sent out through a different front panel port (e.g., port 2) of SS 202. In another example, connection data 600 may include a network address (e.g., an IP address) and port information (e.g., port number 2055), tunneling or encapsulation details for communicating with a relevant external TMA 120.

Referring to FIG. 6, connection data 600 may be depicted using a table representing associations between a physical port (e.g., a front panel or back panel port) of a smartswitch and traffic from or to a particular DPU. For example, each row or association may include a physical port identifier, a DPU identifier, and metadata (e.g., information about the type of traffic that is being exposed).

In some embodiments, a physical port identifier may include any suitable information for identifying a physical port (e.g., a front or back panel port of SS 202) for exposing DPU traffic, e.g., to a physically connected external TMA 120. For example, a physical port identifier may be an integer (e.g., a number printed above or below a respective Ethernet socket or jack of SS 202) that uniquely identifies a physical port of SS 202.

In some embodiments, a DPU identifier may include any suitable information for identifying a DPU in a smartswitch (e.g., SS 202). For example, a DPU identifier may be a value (e.g., an alphanumeric value, an integer, or a letter (e.g., DPU B), an IP management address, a virtual IP address (VIP), etc. that uniquely identifies a DPU of SS 202.

In some embodiments, metadata may include any information about traffic that is being exposed or other information associated with a respective DPU or a physical port. For example, metadata may indicate what type of DPU traffic is exposed via a corresponding physical port, e.g., that all traffic sent to or from a DPU is exposed, that only test traffic (e.g., traffic generated or triggered by test system 102) sent to or from a DPU is exposed, that only HA related traffic sent to or from a DPU is exposed, etc.

It will be appreciated that connection data 600 in FIG. 6 is for illustrative purposes and that different and/or additional information may also be stored or maintained. Further, it will be appreciated connection data 600 or related data may be stored in various data structures, memories, media, and/or in one or more locations.

Figure 7:
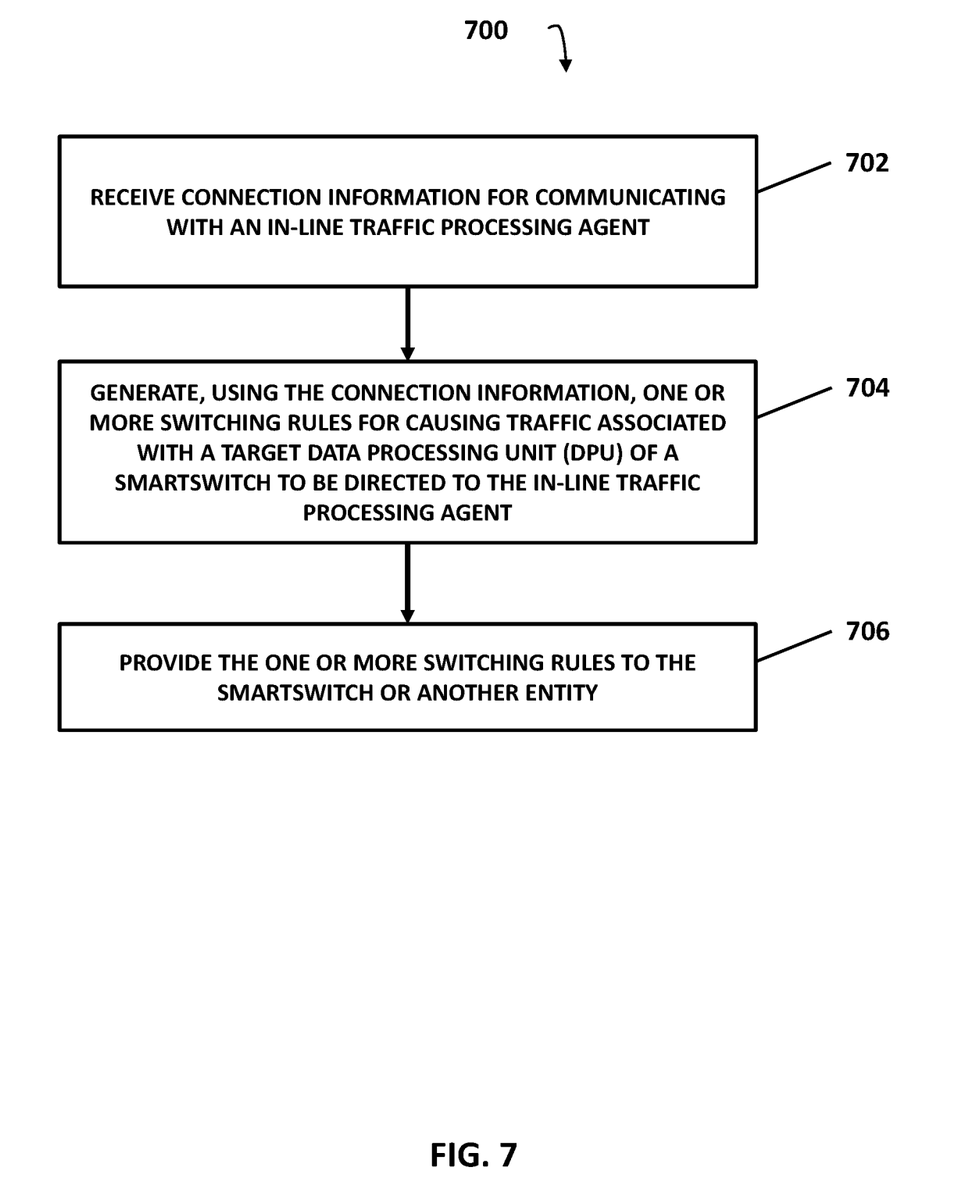
FIG. 7 is a diagram illustrating an example process for exposing DPU traffic in a smartswitch.

FIG. 7 is a diagram illustrating an example process 700 for exposing DPU traffic in a smartswitch. In some embodiments, process 700, or portions thereof, may be performed by or at test system 102, monitoring system 494, SS controller 298, a DPU traffic exposure module, and/or another node or module. In some embodiments, process 700 may include steps 702, 704, and 706.

Referring to process 700, in step 702, connection information for communicating with an in-line traffic processing agent may be received. For example, test system 102 or another entity (e.g., TSC 116) may receive (e.g., from user 296) configuration information indicating which port number(s) of SS 202 and/or SS 204 are connected to one or more TMA 120. In another example, monitoring system 494 or another entity (e.g., MSC 496) may receive (e.g., from user 296) configuration information indicating which port number(s) of SS 202 and/or SS 204 are connected to TMA 120 or a network address and/or port information for communicating with TMA 120.

In step 704, one or more switching rules may be generated using the connection information. In some embodiments, the one or more switching rules may be for causing traffic (e.g., HA messages, test messages, or other messages) associated with a target DPU (e.g., DPU C) of a smartswitch (e.g., SS 202) to be directed to the in-line traffic processing agent (e.g., an external or internal TMA 120).

In step 706, the one or more switching rules may be provided to the smartswitch or another entity. For example, SS controller 298 (e.g., a DPU traffic exposure module or an SDN controller) may send switching rules to SS 204, e.g., via a management port or API, for deployment at switch processor 206.

In some embodiments, a smartswitch controller (e.g., SS controller 298 performing process 700) may include an NPB, an NPB controller, an SDN controller, a test system controller (e.g., TSC 116), a monitoring system controller (e.g., MSC 496), or a DPU traffic exposure module of a test system (e.g., test system 102) or a monitoring system (e.g., monitoring system 494).

In some embodiments, connection information (e.g., received by SS controller 298 or another entity) may include one or more port identifiers (e.g., port numbers identifying front panel ports) of a smartswitch (e.g., SS 202) for communicating with an in-line traffic processing agent (e.g., an external TMA 120), a network address (e.g., an IP address) associated with the in-line traffic processing agent, or information identifying a second DPU of the smartswitch implementing the in-line traffic processing agent (e.g., an internal TMA 120).

In some embodiments, an in-line traffic processing agent may be located external to a smartswitch and may be accessed via a physical port (e.g., a front panel port) of the smartswitch. For example, SS controller 298 may generate and provide switching rules to switch processor 206 of SS 204, e.g., via a management port or API. In this example, the switching rules may cause traffic to or from a target DPU of SS 204 to be sent (e.g., via a front panel port of SS 204) to an external device implementing TMA 120.

In some embodiments, an in-line traffic processing agent may be internal to the smartswitch and may be implemented by a second DPU of the smartswitch. For example, SS controller 298 may configure a DPU of SS 202 to execute or implement TMA 120. In this example, TMA 120 may compute metrics or network flow records related to DPU traffic and send this information to another entity (e.g., test system 102 or monitoring system 494), e.g., an external port of SS 204. Continuing with this example, after processing the DPU traffic, TMA 120 may send or provide the DPU traffic to the appropriate DPU.

In some embodiments, providing one or more switching rules to a smartswitch or another entity may include providing instructions for causing a non-target DPU to implement the in-line traffic processing agent, a traffic monitoring probe, or a test agent. For example, SS controller 298 may generate or provide instructions to SS 202 for configuring a particular DPU of SS 202 to implement TMA 120. In this example, switching rules may be provided such that traffic sent to a target DPU of SS 202 is first diverted to the DPU implementing TMA 120 before the traffic is sent to the target DPU.

In some embodiments, providing one or more switching rules to a smartswitch or another entity may include providing instructions for causing a switch processor (e.g., an ASIC switch or switching module) of the smartswitch to install or utilize the one or more switching rules. For example, SS controller 298 may generate or provide switching rules to switch processor 206 of SS 202 and switch processor 207 of SS 204, e.g., via a management port or API. In this example, each of switch processors 206 and 207 may implement the switching rules for a particular time period or indefinitely (e.g., until new switching rules are received).

In some embodiments, providing one or more switching rules to a smartswitch or another entity may include providing instructions for causing a switch processor (e.g., an ASIC switch or switching module) of the smartswitch to ignore or discard network traffic, non-test traffic, or traffic that may be unrelated to an HA configuration of the smartswitch or the target DPU. For example, test system 102 or TSC 116 may configure SS 202 and SS 204 (e.g., via SS controller 298) to drop, discard, or ignore packets that are not relevant for a particular test session.

In some embodiments, one or more switching rules (e.g., generated by SS controller 298) may include at least one switching rule for sending inter-DPU traffic (e.g., HA messages between DPU HA peers) to an in-line traffic processing agent (e.g., TMA 120). In some embodiments, inter-DPU traffic may include messages to a first DPU (DPU B) of a first smartswitch (e.g., SS 202) from a second DPU (DPU H) of a second smartswitch (e.g., SS 204). In some embodiments, inter-DPU traffic may include messages from a first DPU (DPU B) of a first smartswitch (e.g., SS 202) to a second DPU (DPU H) of a second smartswitch (e.g., SS 204).

In some embodiments, an in-line traffic processing agent (e.g., TMA 120) may be configured for performing at least one monitoring or reporting processing task; modifying DPU traffic (e.g., changing payload and/or header content); impairing the DPU traffic; decrypting or re-encrypting the DPU traffic; discarding the DPU traffic; performing traffic analysis; generating metadata or at least one metric associated with the DPU traffic, generating NetFlow information, generating latency metric information, generating packet count metric information, performing packet capture, performing packet encapsulation, reporting at least one performance metric, or generating test traffic destined for one or more DPU(s) of a smartswitch.

It will be appreciated that process 700 is for illustrative purposes and that different and/or additional actions may be used. It will also be appreciated that various actions described herein may occur in a different order or sequence.

It should be noted that test system 102, SS controller 298, monitoring system 494, MSC 496, a DPU traffic exposure module, and/or functionality described herein may constitute one or more special purpose computing devices. Further, test system 102, SS controller 298, monitoring system 494, MSC 496, a DPU traffic exposure module, and/or functionality described herein can improve the technological field of testing networks and related nodes by providing mechanisms, systems, methods, and/or techniques for exposing DPU traffic in a smartswitch. For example, a smartswitch may be configured using switching rules and/or other instructions to route certain traffic (e.g., HA message) to or from a captive DPU (e.g., DPU B) in a smartswitch (e.g., SS 202) to an internal or external in-line traffic processing agent (e.g., TMA 120). In this example, after processing the traffic, the in-line traffic processing agent may provide the traffic back to the captive DPU or another DPU for further processing.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for exposing data processing unit (DPU) traffic in a smartswitch, the method comprising:
   at a smartswitch controller implemented using at least one processor:
   receiving connection information for communicating with an in-line traffic processing agent;
   generating, using the connection information, one or more switching rules for causing traffic associated with a target data processing unit (DPU) of a smartswitch to be directed to the in-line traffic processing agent; and
   providing the one or more switching rules to the smartswitch or another entity.

2. The method of claim 1 wherein the smartswitch controller includes a network packet broker (NPB), a NPB controller, a software defined network (SDN) controller, a test system controller, a monitoring system controller, or a DPU traffic exposure module of a test system or a monitoring system.

3. The method of claim 1 wherein the connection information includes one or more port identifiers of the smartswitch for communicating with the in-line traffic processing agent, a network address associated with the in-line traffic processing agent, or information identifying a second DPU of the smartswitch implementing the in-line traffic processing agent.

4. The method of claim 1 wherein the in-line traffic processing agent is located external to the smartswitch and is accessed via a physical port of the smartswitch or the in-line traffic processing agent is internal to the smartswitch and is implemented by a second DPU of the smartswitch.

5. The method of claim 1 wherein providing the one or more switching rules to the smartswitch or another entity includes providing instructions for causing a non-target DPU to implement the in-line traffic processing agent, a traffic monitoring probe, or a test agent.

6. The method of claim 1 wherein providing the one or more switching rules to the smartswitch or another entity includes providing instructions for causing a switch processor of the smartswitch to install or utilize the one or more switching rules.

7. The method of claim 1 wherein providing the one or more switching rules to the smartswitch or another entity includes providing instructions for causing a switch processor of the smartswitch to ignore or discard network traffic, non-test traffic, or traffic that is unrelated to a high availability configuration of the smartswitch or the target DPU.

8. The method of claim 1 wherein the one or more switching rules includes at least one switching rule for sending inter-DPU traffic to the in-line traffic processing agent, wherein the inter-DPU traffic includes messages from or to a second DPU of a second smartswitch.

9. The method of claim 1 wherein the in-line traffic processing agent is configured for performing at least one monitoring or reporting processing task; modifying DPU traffic; impairing the DPU traffic; decrypting or re-encrypting the DPU traffic; discarding the DPU traffic; performing traffic analysis; generating metadata or at least one metric associated with the DPU traffic, generating NetFlow information, generating latency metric information, generating packet count metric information, performing packet capture, performing packet encapsulation, reporting at least one performance metric, or generating test traffic destined for the target DPU or another DPU of the smartswitch.

10. A system for exposing data processing unit (DPU) traffic in a smartswitch, the system comprising:
  at least one processor; and
  a memory; and
  a smartswitch controller implemented using the at least one processor and the memory, the smartswitch controller configured for:
    receiving connection information for communicating with an in-line traffic processing agent;
    generating, using the connection information, one or more switching rules for causing traffic associated with a target data processing unit (DPU) of a smartswitch to be directed to the in-line traffic processing agent; and
    providing the one or more switching rules to the smartswitch or another entity.

11. The system of claim 10 wherein the smartswitch controller includes a network packet broker (NPB), a NPB controller, a software defined network (SDN) controller, a test system controller, a monitoring system controller, or a DPU traffic exposure module of a test system or a monitoring system.

12. The system of claim 10 wherein the connection information includes one or more port identifiers of the smartswitch for communicating with the in-line traffic processing agent, a network address associated with the in-line traffic processing agent, or information identifying a second DPU of the smartswitch implementing the in-line traffic processing agent.

13. The system of claim 10 wherein the in-line traffic processing agent is located external to the smartswitch and is accessed via a physical port of the smartswitch or the in-line traffic processing agent is internal to the smartswitch and is implemented by a second DPU of the smartswitch.

14. The system of claim 10 wherein providing the one or more switching rules to the smartswitch or another entity includes providing instructions for causing a non-target DPU to implement the in-line traffic processing agent, a traffic monitoring probe, or a test agent.

15. The system of claim 10 wherein the smartswitch controller is configured for providing instructions for causing a switch processor of the smartswitch to install or utilize the one or more switching rules.

16. The system of claim 10 wherein the smartswitch controller is configured for providing instructions for causing a switch processor of the smartswitch to ignore or discard network traffic, non-test traffic, or traffic that is unrelated to a high availability configuration of the smartswitch or the target DPU.

17. The system of claim 10 wherein the one or more switching rules includes at least one switching rule for sending inter-DPU traffic to the in-line traffic processing agent, wherein the inter-DPU traffic includes messages from or to a second DPU of a second smartswitch.

18. The system of claim 17 wherein the inter-DPU traffic includes high-availability (HA) messages.

19. The system of claim 10 wherein the in-line traffic processing agent is configured for performing at least one monitoring or reporting processing task; modifying DPU traffic; impairing the DPU traffic; decrypting or re-encrypting the DPU traffic; discarding the DPU traffic; performing traffic analysis; generating metadata or at least one metric associated with the DPU traffic, generating NetFlow information, generating latency metric information, generating packet count metric information, performing packet capture, performing packet encapsulation, reporting at least one performance metric, or generating test traffic destined for the target DPU or another DPU of the smartswitch.

20. A non-transitory computer readable medium having stored thereon executable instructions embodied in the non-transitory computer readable medium that when executed by at least one processor of a computing device cause the computing device to perform steps comprising:
  receiving connection information for communicating with an in-line traffic processing agent;
  generating, using the connection information, one or more switching rules for causing traffic associated with a target data processing unit (DPU) of a smartswitch to be directed to the in-line traffic processing agent; and
  providing the one or more switching rules to the smartswitch or another entity.

* * * * *